United States Patent [19]

Josten et al.

[11] 4,125,497
[45] Nov. 14, 1978

[54] METHOD FOR MANUFACTURING HEAT-CURED MOLDED ARTICLES FROM CEMENT

[75] Inventors: Friedrich Josten; Martin Cherubim, both of Moers; Karl-Heinz Renkes, Kamp-Lintfort, all of Fed. Rep. of Germany

[73] Assignee: Deutsche Texaco Aktiengesellschaft, Fed. Rep. of Germany

[21] Appl. No.: 690,443

[22] Filed: May 27, 1976

[30] Foreign Application Priority Data

May 31, 1975 [DE] Fed. Rep. of Germany ........ 2524199

[51] Int. Cl.² .............................................. C08L 91/00
[52] U.S. Cl. ............................ 260/18 R; 260/29.2 R; 260/37 R; 264/333; 264/333
[58] Field of Search .................................. 106/90, 315; 260/29.6 S, 37 R, 18 R, 29.2 R

[56] References Cited

U.S. PATENT DOCUMENTS

| | | | |
|---|---|---|---|
| 2,770,840 | 11/1956 | Biefeld et al. | 264/319 |
| 2,859,192 | 11/1958 | Harvey et al. | 260/29.6 NR |
| 3,075,935 | 1/1963 | Shay | 260/29.6 S |
| 3,437,619 | 4/1969 | Nutt | 260/29.6 S |
| 3,865,779 | 2/1975 | Oya et al. | 260/37 N |
| 3,972,723 | 8/1976 | Balle et al. | 106/90 |
| 3,981,834 | 9/1976 | Kern et al. | 260/42.55 |

FOREIGN PATENT DOCUMENTS 49-99,117  9/1974  Japan ........................ 264/233

OTHER PUBLICATIONS

"Chem. of Cement & Concrete" by Lea, F. M., pp. 464 and 519, Edward Arnold Ltd., London, 1956.

*Primary Examiner*—Jay H. Woo
*Attorney, Agent, or Firm*—Carl G. Ries; Thomas H. Whaley; Douglas H. May, Jr.

[57] ABSTRACT

An improved method of manufacturing shaped objects from cement wherein cement is wetted with an aqueous solution of an acetone-formaldehyde resin, optionally including a water-soluble alcohol, the wet mixture molded to the desired shape and then cured preferably at a temperature within the range of 30° C to 100° C, wherein the bending strength of the finished product is improved by incorporating a metal soap in the composite prior to molding the wet mixture.

Also disclosed is an improved composition of matter comprising Portland cement, an acetone-formaldehyde resin and a metal soap, and optionally containing an inorganic aggregate.

5 Claims, No Drawings

METHOD FOR MANUFACTURING HEAT-CURED MOLDED ARTICLES FROM CEMENT

BACKGROUND OF THE INVENTION

This invention relates to an improvement in the method of manufacturing shaped objects from cement and a condensation resin in which an aqueous or aqueous-alcoholic solution of an acetone-formaldehyde resin is employed in preparing a moldable mixture which may contain an inorganic aggregate.

It has now been found that the bending strength of the finished product, for example a molded rod, can be increased unexpectedly by incorporating a metal soap, e.g. calcium stearate, in the molding mixture.

The composition of matter of this invention may be used also in patching compounds, e.g. for repairs in concrete floors, walks, and the like.

SUMMARY OF THE INVENTION

It is an object of this invention to provide an improved method of producing finished products of superior quality from cement and a condensation resin of the acetone-formaldehyde type.

It is another object of this invention to provide an improved composition of matter comprising cement.

The method of this invention comprises forming a moldable mixture of cement, optionally containing sand or similar inorganic aggregate, and an aqueous solution or an aqueous-alcoholic solution of an acetone-formaldehyde resin, and comprising from 0.1 to 0.5 weight percent, based on the weight of the solid inorganic materials, of a metal soap, molding the mixture to the desired shape, and curing the resultant product, preferably at a temperature in the range of 30° C. to 100° C.

The composition of matter of this invention comprises cement, an acetone-formaldehyde resin, and from 0.1 to 0.5 percent by weight of a soap of a divalent or trivalent metal, optionally in admixture with an inorganic aggregate. When an aggregate is included in the composition, the amount of metal soap employed is equivalent to 0.1 to 0.5 percent by weight based on the total weight of the inorganic solid components of the composition, e.g., the combined weight of the cement and sand in the composition. The amount of resin contained in the composition may range from 0.15 to 0.25 part by weight per part by weight of cement in the composition.

DETAILED DESCRIPTION OF THE INVENTION

This invention relates to a method of manufacuturing shaped parts from cement and an acetone-formaldehyde condensation resin, hereinafter also referred to as "AF" resin. The method comprises mixing the cement to a paste with an aqueous or aqueous-alcohol solution of an acetone-formaldehyde resin and, if desired, with aggregates, pouring the paste into a mold and curing the molded paste at an elevated temperature of between about 30° C. and 100° C. From 10 to 100 parts by weight (basis solids content) of acetone-formaldehyde resin solution and used per 100 parts by weight of cement. Preferably, the AF resin is produced by an alkaline condensation reaction at a temperature of between 20° C. and 100° C. and has a mole ratio of acetone by formaldehyde of 1 : 1.5 to 5, and is advantageously employed as a 30 to 60 percent aqueous or aqueous-alcoholic solution. Up to 25 percent of the acetone contained in said resin, may be replaced by other compounds reactive with formaldehyde.

Shaped parts made from cement, and optionally containing inorganic aggregates, can be cured in considerably shorter time than conventional and at elevated temperatures, i.e., in the range of from 30° to 100° C., preferably in the range of from 60° to 90° C., when said cement is mixed with an AF resin solution, rather than with water. The curing can be carried out at normal pressure or at an elevated pressure up to 150 kp/cm². In either case, a substantial improvement in the bending strength of the finished product is obtained, in addition to the advantage of the faster curing time.

Surprisingly, it was found that even better bending strengths may be achieved by blending the cement-AF resin solution with from 0.1 to 0.5, preferably 0.2 to 0.4, percent by weight (related to the weight of cement and sand) of a soap of a bi or triavalent metal.

Metal soaps are utilised in many different industries. For example, they are used as lubricating oil additives, pigment suspending agents in colors, activators in rubber vulcanization, stabilizers for polyvinyl chloride (PVC), emulsifiers in water-in-oil emulsions for cosmetic purposes, additives to pastes and waxes, and lubricants in the manufacture of shaped parts from powders and injection molded parts of light metal. Calcium stearate has been added to cement in concrete pavement to improve its resistance to salt water. In all of these applications, use is made mainly of the high surface activity of the metal soap. In these applications, however, these metal soaps do not improve the physical properties of the product.

Therefore, it was not obvious that metal soaps in shaped parts from cement, optionally containing inorganic aggregates, and AF resin could result in a product having an increased bending strength. In addition, the moldability, or molding capability of the mixture is improved. Molding capability is to be understood as the self compression or settling property of the cement-sand mixture. The better the mixture's capability of settling, the easier the removal from the mold and the smoother the surface areas of the shaped parts.

Suitable metal soaps are the soaps of all bi- or trivalent metals e.g., calcium, barium, magnesium, aluminum, zinc, and manganese. Of course, also the soaps of other bi- or trivalent metals, e.g., cobalt, copper, nickel, may be used; however, for economic reasons, the first mentioned metals are preferred.

The anionic hydrophobic part in the metal soaps used according to the invention can be the remainder of any acid commonly used for metal soaps, e.g. saturated and unsaturated aliphatic monocarboxylic acids having from 10 to 20 carbon atoms, including stearic acid, palmitic acid, lauric acid, and oleic acid, rosinic acids, e.g. abietinic acid, and naphthenic acids. Especially preferred is calcium stearate since this metal soap is most easily available.

The invention is illustrated by the following Examples:

EXAMPLE 1

750 grams of sand and 250 grams of Portland cement are dry-mixed in a laboratory kneader for initially 2 minutes, whereupon 100 grams of a 60 percent by weight aqueous AF resin solution with an A/F mole ratio of 1 : 2, and metal salts in the amounts as set forth in Table 1 below, were added and mixed for another 2 minutes.

Rods from these mixtures were manufactured in a pile box (according to VDG Merkblatt P 71 of January 1970). The curing conditions employed were: 2 hours at 80° C.

The amounts of the metals employed in each of the respective tests of this example and the data of the bending strengths as tested with the said cured test rods are shown in Table 1:

TABLE 1

| Test No. | % Ca-stearate, basis total solids content of the cement paste mixture | Bending strength N/cm$^2$ |
|---|---|---|
| 1 | 0 | 680 |
| 2 | 0.1 | 800 |
| 3 | 0.2 | 910 |
| 4 | 0.4 | 840 |

EXAMPLE 2

Example 1 was repeated with the exception that calcium stearate was replaced by aluminum stearate. The tests of this example and the respective bending strengths as determined are set forth in Table 2.

TABLE 2

| Test No. | % Al stearate, basis total solids content | Bending strength N/cm$^2$ |
|---|---|---|
| 1 | 0.1 | 780 |
| 2 | 0.2 | 920 |
| 3 | 0.4 | 820 |

EXAMPLE 3

Example 1 was repeated with the exception that calcium stearate was replaced by magnesium stearate.

The tests of this example and the bending strengths as determined are set forth in Table 3.

TABLE 3

| Test No. | % Mg stearate, basis total solids content | Bending strength N/cm$^2$ |
|---|---|---|
| 1 | 0.1 | 740 |
| 2 | 0.2 | 860 |
| 3 | 0.4 | 780 |

EXAMPLE 4

Example 1 was repeated with the exception that the 60 percent by weight aqueous AF resin solution was replaced by a 55 percent aqueous alcoholic AF resin solution obtained by way of diluting the aqueous stock solution with isopropanol to a solids content of 55 percent.

Without the addition of metal soaps the determined bending strength mounted to 980 N/cm$^2$. With the addition of a 0.35 percent calcium stearate, the bending strength amounted to 1070 N/cm$^2$.

For all examples the data for the bending strengths as indicated are average values for 5 test specimen each. Deviations from the average values amount to +15 percent which is quite common in such tests since external influences, such as temperature and humidity, have a strong effect on said data.

Alcohols which may be used in the process comprise the lower alkyl alcohols, e.g. methanol, ethanol, propanol, isopropanol, butanol, isobutanol, and the like.

Cement, as used throughout the specification, refers to Portland cement or its equivalent, e.g., blast furnace cement, sulphate cement, sorrel cement, and the like.

We claim:

1. A composition of matter consisting essentially of 100 parts by weight cement selected from the group consisting of portland cement, blastfurnace cement, sulfate cement and sorrel cement; 15 to 25 parts by weight acetone-formaldehyde resin in an aqueous solution consisting essentially of 30 to 60 weight percent acetonformaldehyde resin dissolved in water; and from 0.1 to 0.5 weight percent, by weight basis of total inorganic solids in said composition, of a soap selected from the group consistin of bivalent and trivalent metal salts of saturated and unsaturated aliphatic monocarboxylic acids of 10 to 20 carbon atoms, and mixtures thereof.

2. A composition of matter according to claim 1 including about 0 to 300 parts by weight sand aggregate.

3. A composition of matter according to claim 2 wherein said cement is Portland cement and wherein said soap is calcium stearate.

4. In a method for producing a shaped concrete article wherein cement, and optionally sand aggregate, is wetted with an aqueous of aqueous-alcoholic solution of an acetone-formaldehyde resin to form a moldable mixture, wherein the mixture is molded into an article of desired shape, and wherein said article is cured at a temperature within the range of 30° to 100° C., the improvement which comprises:

adding from about 0.1 to about 0.5 percent by weight, basis the weight of inorganic solids of said mixture, of a soap selected from the group consisting of the bivalent and trivalent metal salts of saturated and unsaturated aliphatic monocarboxylic acids having from 10 to 20 carbon atoms and mixtures thereof into said mixture prior to molding in an amount sufficient for increasing the bending strength of said shaped concrete article.

5. The method according to claim 4, wherein said soap is calcium stearate.

* * * * *